US005893146A

United States Patent [19]
Pickett

[11] Patent Number: 5,893,146
[45] Date of Patent: Apr. 6, 1999

[54] CACHE STRUCTURE HAVING A REDUCED TAG COMPARISON TO ENABLE DATA TRANSFER FROM SAID CACHE

[75] Inventor: James K. Pickett, Austin, Tex.

[73] Assignee: Advanced Micro Design, Inc., Sunnyvale, Calif.

[21] Appl. No.: 935,531

[22] Filed: Sep. 23, 1997

Related U.S. Application Data

[63] Continuation of Ser. No. 521,665, Aug. 31, 1995, abandoned.

[51] Int. Cl.$^6$ ................................................ G06F 12/08
[52] U.S. Cl. ............................................................ 711/128
[58] Field of Search ............................. 711/118, 128, 711/154, 163; 365/49, 230.01, 230.03

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 395/402 |
| 4,631,660 | 12/1986 | Woffinden et al. | 711/3 |
| 4,807,115 | 2/1989 | Torng | 395/391 |
| 4,858,105 | 8/1989 | Kuriyama et al. | 395/582 |
| 5,014,195 | 5/1991 | Farrell et al. | 711/128 |
| 5,210,845 | 5/1993 | Crawford et al. | 711/128 |
| 5,226,126 | 7/1993 | McFarland et al. | 395/394 |
| 5,226,130 | 7/1993 | Favor et al. | 395/585 |
| 5,428,565 | 6/1995 | Shaw | 365/49 |
| 5,548,742 | 8/1996 | Wang et al. | 711/128 |
| 5,659,699 | 8/1997 | Breternitz, Jr. | 711/216 |
| 5,684,976 | 11/1997 | Soheili-Arasi et al. | 711/128 |
| 5,721,863 | 2/1998 | Covino et al. | 711/128 |

FOREIGN PATENT DOCUMENTS

| | | |
|---|---|---|
| 0259095 | 3/1988 | European Pat. Off. |
| 0381471 | 8/1990 | European Pat. Off. |
| 0459232 | 12/1991 | European Pat. Off. |
| 2263985 | 8/1993 | United Kingdom . |
| 2263987 | 8/1993 | United Kingdom . |
| 2281422 | 3/1995 | United Kingdom . |

OTHER PUBLICATIONS

Mano, M. Morris. Digital Design, Prentice Hall, pp. 167–170, 1984.
Johnson, M. Superscalar Microprocessor Design, Chapters 3 and 4, pp. 31–85, 1991.
Theobald, K.B. et al. "A Design Framework for Hybrid–Access Caches", Proceedings of the First IEEE Symposium on High–Performance Computer Architecture, IEEE, pp. 144–153, Jan. 1995.
Seznec, A. "DASC Cache", Proceedings of the First IEEE Symposium on High–Performance Computer Architecture, IEEE, pp. 134–143, Jan. 1995.
Intel, "Chapter 2: Microprocessor Architecture Overview," pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.

*Primary Examiner*—Tod R. Swann
*Assistant Examiner*—Conley B. King, Jr.
*Attorney, Agent, or Firm*—Conley, Rose & Tayon, PC; B. Noel Kivlin; Lawrence J. Merkel

[57] ABSTRACT

A cache including a tag storage which compares a portion of the tag address (a "mini-tag") to a respective portion of a request address is provided. If the mini-tag matches, then the way associated with the tag having a match is the way selected for conveying data bytes to the output of the cache. The mini-tag comparison is performed on a field of address bits different from the index field, and the comparison is performed in parallel with the index field decode. The way selection is qualified with the index field decode such that one set and one way of the set is selected for conveying bytes from the cache. The access time of the present cache structure is substantially similar to a direct-mapped cache. However, the present cache strucuture is a set-associative structure. The hit rate and thrashing insensitivity of a set-associative cache are maintained by the present cache.

34 Claims, 4 Drawing Sheets

CACHE STRUCTURE HAVING A REDUCED TAG COMPARISON TO ENABLE DATA TRANSFER FROM SAID CACHE

This application is a continuation of application Ser. No. 08/521,665, filed Aug. 31, 1995, now abandoned.

BACKGROUND OF THE INVENTION

1. Field of the Invention

This invention relates to the field of superscalar microprocessors and, more particularly, to caching structures within superscalar microprocessors.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In an associative structure, the blocks of storage locations are accessed as a two-dimensional array having rows and columns. A row is also referred to as a set, and a column is often referred to as a way. When a cache is searched for bytes residing at an address, a number of bits from the address are used as an "index" into the cache. The index selects a particular set within the two-dimensional array, and therefore the number of address bits required for the index is determined by the number of sets configured into the cache. The act of selecting a set via an index is referred to as "indexing". The addresses associated with bytes stored in the multiple blocks of a set are examined to determine if any of the addresses stored in the set match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a set form the columns of the set. Each block of memory is referred to as a "way"; multiple ways comprise a set. The way is selected by providing a way value to the cache. The way value is determined by examining the tags of a set and finding a match between one of the tags and the requested address. A cache designed with one way per set is referred to as a "direct-mapped cache". In a direct-mapped cache, the tag must be examined to determine if an access is a hit, but the tag examination is not required to select which bytes are transferred to the outputs of the cache. Since only an index is required to select bytes from a direct-mapped cache, the direct-mapped cache is a "linear array" requiring only a single value to select a storage location within it.

Both direct-mapped and associative caches are employed in high frequency (i.e. short clock cycle) superscalar microprocessors. In high frequency applications, set associative caches either become a clock cycle limiter or require multiple clock cycles to complete a cache access because the comparison of tags to the request address and the subsequent selection of data bytes to convey to the output requires more time than the desired clock cycle time allows. Cache bandwidth (i.e. the number of cache requests which may be made per clock cycle) decrease due to multiple clock cycle accesses is particularly detrimental to superscalar microprocessors attempting to execute multiple instructions (which may require cache access) per clock cycle. If the cache is pipelined such that a cache access may be performed each clock cycle even though each cache access requires multiple clock cycles to complete, the latency associated with a particular access is detrimental to performance. Longer clock cycles are also detrimental to the performance of a microprocessor, since fewer instructions may be executed per second.

Direct-mapped caches, which compare the selected tag to the request address in parallel with conveying data bytes to the output, operate in less time than the associative cache. Unfortunately, direct-mapped caches are associated with lower hit rates (i.e. the percentage of accesses that are hits) than associative caches with a similar storage capacity. Furthermore, direct-mapped caches are more susceptible to "thrashing". Thrashing is a phenomenon that occurs when the pattern of address requests presented to the cache contains several dissimilar addresses with the same index. Dissimilar addresses are addresses that are stored in the cache with different tags. As an illustrative example, addresses A and B may access the cache alternately and repeatedly. Address A and address B have the same index, and access a direct-mapped cache. First, address A accesses the cache and misses. The indexed cache storage location is filled with bytes associated with address A. Next, address B accesses the cache and misses. The indexed cache storage location discards the bytes associated with address A and is filled with bytes associated with address B. Address A accesses the cache again, and misses: The cache storage location discards the bytes associated with address B and is filled with bytes associated with address A. An associative cache would be able to store bytes associated with both address A and address B simultaneously. A storage device having the access time of a direct-mapped cache with the hit rate and insensitivity to thrashing of an associative cache is desired.

SUMMARY OF THE INVENTION

The problems outlined above are in large part solved by a cache according to the present invention. The present cache includes a tag storage which compares a portion of the tag address (a "mini-tag") to a respective portion of a request address. If the mini-tag matches, then the way associated with the tag having a match is the way selected for conveying data bytes to the output of the cache. The mini-tag comparison is performed on a field of address bits different from the index field, and the comparison is performed in parallel with the index field decode. The way selection is qualified with the index field decode such that one set and one way of the set is selected for conveying bytes from the cache. Advantageously, the access time of the present cache is substantially similar to a direct-mapped cache. However, the present cache is a set-associative structure. The superior hit rate and thrashing insensitivity of a set-associative cache are advantageously maintained.

Broadly speaking, the present invention contemplates a cache comprising an input bus, a plurality of data storage locations, a plurality of tag storage locations, a plurality of comparator circuits, a decoder, and a qualification circuit. The input bus is configured to convey at least one request address, while the plurality of data storage locations are configured to store contiguous bytes of information. Coupled to the input bus, the plurality of tag storage locations are configured to store tag addresses associated with the contiguous bytes of information. Also coupled to the input bus as well as to the plurality of tag storage locations is the plurality of comparator circuits. The plurality of comparator circuits are configured to receive a field of address bits from the request address and to receive corresponding fields of address bits from the tag addresses. Each of the plurality of comparator circuits is configured to produce a signal indicative of equality between the field and one of the corresponding fields. The decoder is additionally coupled to the input bus and to the plurality of tag storage locations. The decoder is configured to convey a second signal indicative of selection of a group of the plurality of storage locations according to a second field of address bits from the request address. Coupled to receive the signals from the comparator circuits and the second signals from the decoder, the qualification circuit qualifies each of the signals with the second signal, thereby producing a third signal. The plurality of data storage locations are coupled to receive the third signal and to convey data bytes upon an output bus according to the third signal. The present invention further contemplates a superscalar microprocessor employing a data cache as described.

The present invention still further contemplates A method of accessing an associative cache comprising several steps. A tag storage within the associative cache is accessed with an address. A field of bits from the address is compared to respective fields of address bits from tag addresses stored within the tag storage. Finally, bytes of information associated with a particular tag address indicated by the comparing step are conveyed to an output of the associative cache.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 1:
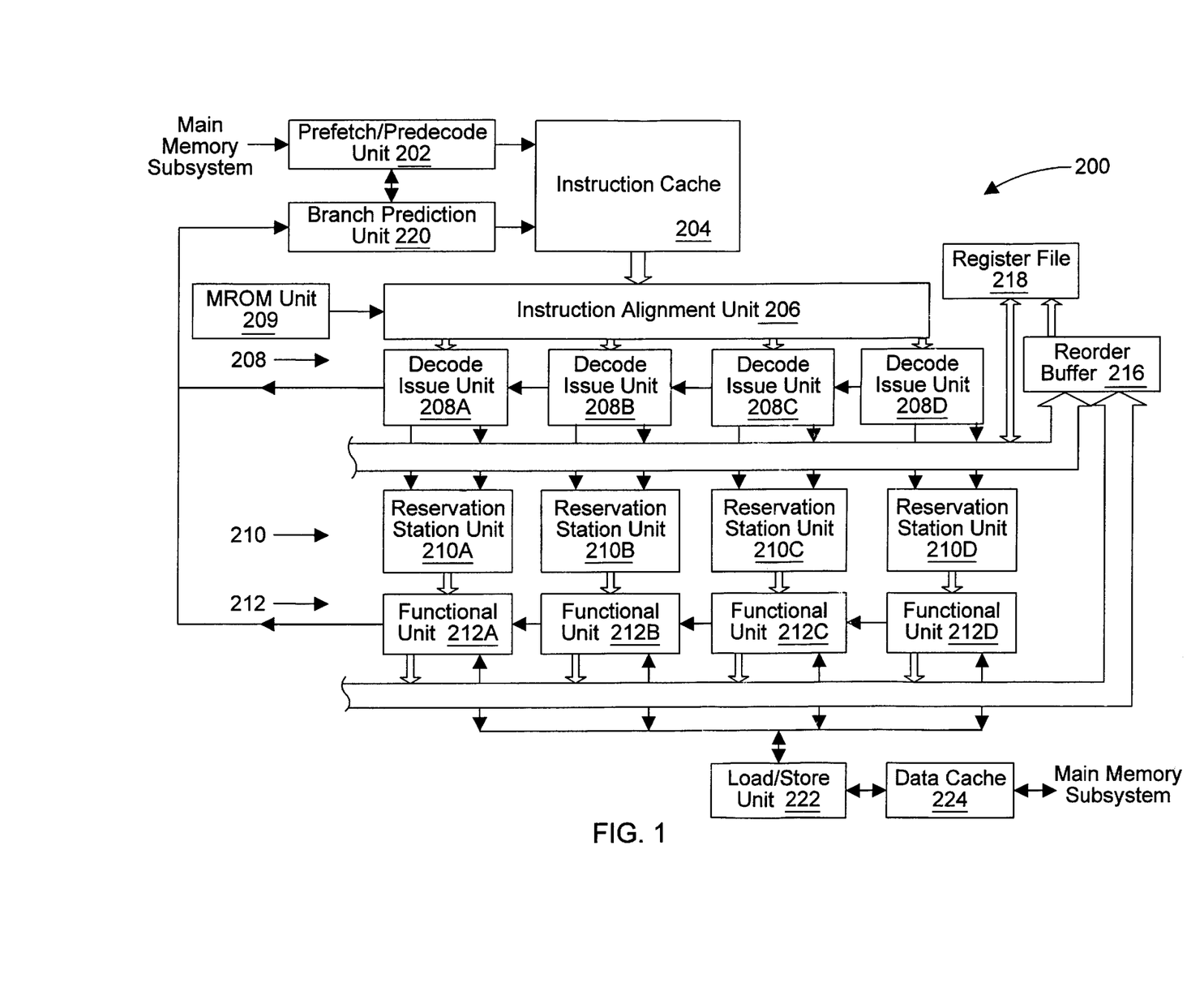
FIG. 1 is a block diagram of a superscalar microprocessor including an instruction cache and a data cache according to the present invention.

Referring next to FIG. 1, a block diagram of a superscalar microprocessor 200 including an instruction cache 204 and a data cache 224 in accordance with the present invention is shown. As illustrated in the embodiment of FIG. 1, superscalar microprocessor 200 includes a prefetch/predecode unit 202 and a branch prediction unit 220 coupled to instruction cache 204. Instruction alignment unit 206 is coupled between instruction cache 204 and a plurality of decode units 208A–208D (referred to collectively as decode units 208). Each decode unit 208A–208D is coupled to respective reservation station units 210A–210D (referred to collectively as reservation stations 210), and each reservation station 210A–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM (microcode read only memory) unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration. In one embodiment, instruction cache 204 is eight way set-associative, and employs a caching structure according to the present invention.

Prefetch/predecode unit 202 is provided to prefetch instruction code from the main memory for storage within instruction cache 204. In one embodiment, prefetch/ predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM (mode register/memory) or an SIB (scale-index-base) byte, or whether the byte contains displacement or immediate data.

TABLE 1

Encoding of Start, End and Functional Bits

| Instr. Byte Number | Start Bit Value | End Bit Value | Functional Bit Value | Meaning |
|---|---|---|---|---|
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3-8 | 0 | | 0 | Mod R/M or SIB byte |
| 3-8 | 0 | X | 1 | Displacement or immediate data; the second functional bit set in bytes 3-8 indicates immediate data |
| 1-8 | X | 0 | X | Not last byte of instruction |
| 1-8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation. A listing of exemplary x86 instructions categorized as fast path instructions as well as a description of the manner of handling both fast path and MROM instructions will be provided further below.

Instruction alignment unit 206 is provided to channel variable byte length instructions from instruction cache 204 to fixed issue positions formed by decode units 208A–208D. Instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the caching structure employed within instruction cache 204 and data cache 224, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208D routes displacement and immediate data to a corresponding reservation station unit 210A–210D. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208D are routed directly to respective reservation station units 210A–210D. In one embodiment, each reservation station unit 210A–210D is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions. Each of the four reservation stations 210A–210D contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a load/store buffer with eight storage locations for data and address information for pending loads or stores. Decode units 208 arbitrate for access to the load/store unit 222. When the buffer is full, a decode unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to sixteen kilobytes of data. It is understood that data cache 224 may be implemented in a variety of specific memory configurations, including a set associative configuration. In one embodiment, data cache 224 is eight way set-associative and employs a cache structure according to the present invention.

Figure 2:
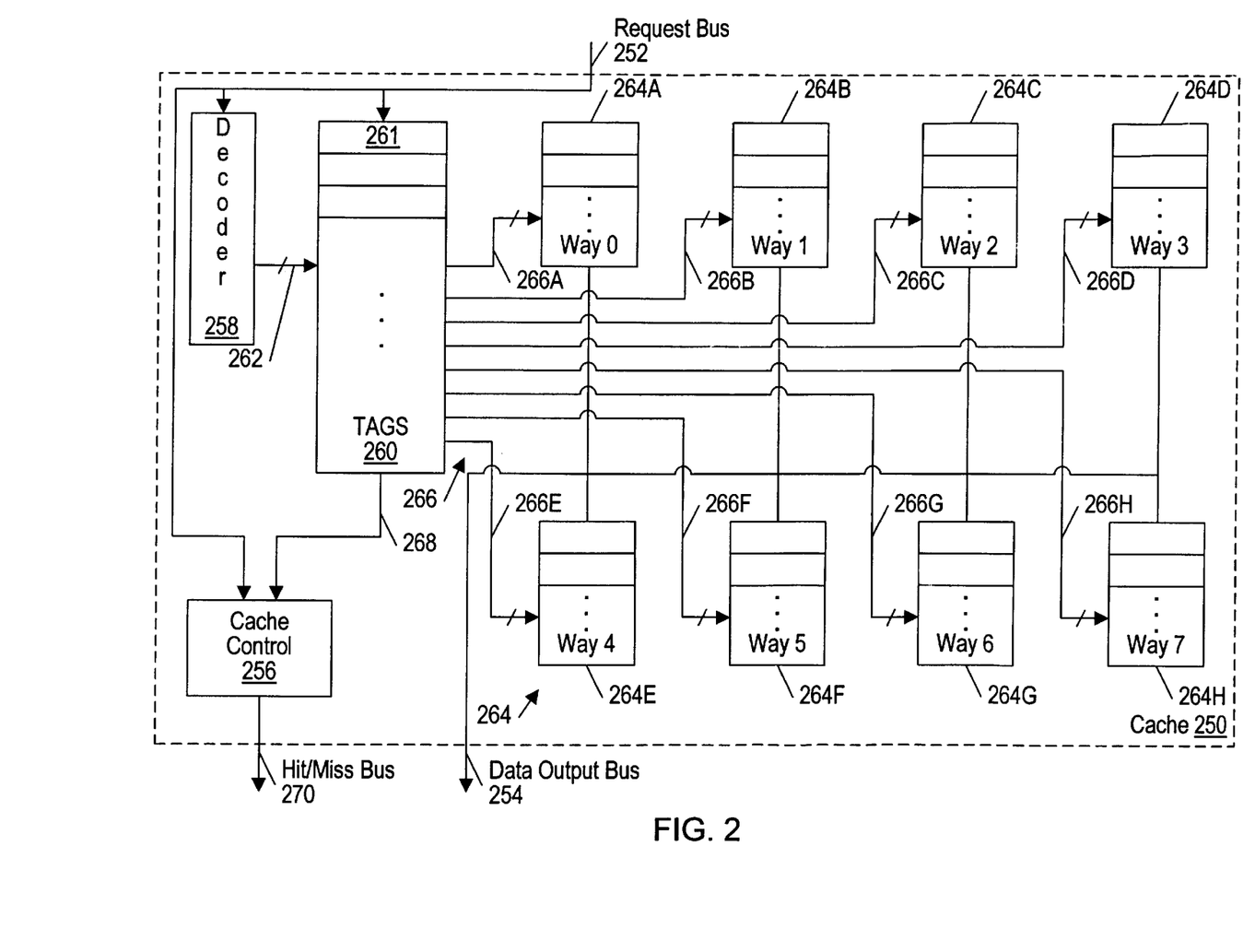
FIG. 2 is a block diagram of portions of the instruction and data caches employed within the superscalar microprocessor of FIG. 1.

Turning next to FIG. 2, a block diagram of the present cache 250 is shown. Cache 250 receives a request bus 252 from a unit configured to perform cache accesses. In one embodiment, cache 250 is employed within instruction cache 204, and logic within instruction cache 204 performs the requests upon request bus 252. In another embodiment, cache 250 is employed within data cache 224 and load store unit 222 performs the requests upon request bus 252. For simplicity, FIG. 2 shows those components of cache 250 associated with the present invention. Other components, not shown, may be included to provide other cache functions or to expand the functionality of cache 250.

Generally speaking, cache 250 is configured to receive one or more requests (including a request address as well as information identifying the type of request) for data on request bus 252, and to provide data associated with the request address on a data output bus 254. Request bus 252 is coupled to a cache control unit 256, a decoder 258, and a tag storage 260. Cache control unit 256 is configured to capture the request address in order to determine the cache hit/miss status of the request. Decoder 258 decodes the index field of the address in order to select a set of cache 250. Tag storage 260 receives the decode information from decoder 258 across a decode bus 262, and selects a particular way of data storage 264A–264H to convey data bytes on data output bus 254. Each of ways 264 is electrically coupled to output bus 254, and therefore tag storage 260 controls ways 264 such that only one way 264A–264H responds to a particular request. Tag storage 260 selects the way for conveying data bytes via a comparison of a second field of request address bits (referred to as a mini-tag) to a respective field of tag address bits for each tag stored within tag storage 260. The comparison is performed in parallel with decoder 258 performing its decode, such that the way is selected for conveying data in substantially the same amount of time as decoder 258 utilizes to perform its decode. Direct-mapped caches include a similar decoder, and therefore cache 250 conveys data bytes in a time that is substantially similar to a direct-mapped cache. However, cache 250 is configured as an associative cache and therefore advantageously maintains the hit rates and thrashing insensitivity of an associative cache.

As noted above, decoder 258 decodes the request address and produces decode information which it conveys upon decode bus 262 to tag storage 260. In one embodiment, decode bus 262 comprises a signal for each set of tag storage 260. When the signal associated with a particular set is active, then that set is selected by the index field of the request address. A given address input to decoder 258 causes only one of the signals on decode bus 262 to be activated. As used herein, the term "field" when applied to addresses refers to a set of contiguous bits of the address which are logically grouped together. For example, the index field of the address is a set of contiguous bits of the address used to select a set 261 of tag storage 260 and ways 264.

Each set 261 of tag storage 260 includes storage locations associated with each way 264. The storage locations are utilized to store a tag address and associated tag valid information for the associated ways 264A–264H. The tag address identifies data bytes stored within a particular row and way of cache 250. The associated tag valid information identifies a state of the data bytes. In one embodiment, the state may be either valid or invalid. If the state is valid, then the data bytes stored in the associated data storage location are associated with the tag address. If the state is invalid, then the data bytes stored in the associated data storage location are not associated with the tag address and should be ignored. This state scheme may be employed when cache 250 is implemented as an instruction cache. In another embodiment, the state may be invalid, shared, exclusive, and exclusive-modified (i.e. the MESI state scheme). This state scheme may be employed when cache 250 is implemented as a data cache.

Each way 264 includes a number of rows of storage equal to the number of sets 261 of tag storage 260. Each row is a data storage location capable of storing a set of contiguous data bytes stored in main memory at an address identified by the associated tag address stored within tag storage 260. It is noted that any number of contiguous bytes may be stored within a data storage location for various embodiments of cache 250.

While decoder 258 is decoding the index field of the address, tag storage 260 is comparing the mini-tag field of the stored tag addresses to the corresponding field of the request address. As will be explained in more detail with respect to FIG. 3, the tag comparisons result in signals indicative of a match between the mini-tags of the request address and the respective tag addresses. These signals are then "qualified" with the row selection signals from decode bus 262 such that signals will be asserted only for the selected row. The qualified signals are conveyed to each of ways 264 on a set of way selection buses 266A–266H. Each way selection bus 266A–266H conveys a number of signals equal to the number of signals conveyed on decode bus 262. Each signal of a particular selection bus 266A–266H is indicative of selection of a particular row within a respective way 264A–264H to convey the data bytes it stores upon data output bus 254. A particular set of tag storage 260 conveys one of the signals upon each of way selection buses 266, wherein the signal conveyed is indicative of the set of tag storage 260 being selected by the index of the request address and the way having a mini-tag which matches the mini-tag field of the request address.

Since data output bus 254 is coupled to each of ways 264, it is important that one way and one row of that way convey data bytes on data output bus 254. By qualifying the comparison signals generated by tag storage 260 with the set selection indicated by decoder 258, the possible way selection signals that may be activated for the request are limited to one row. Cache control unit 256 is configured to ensure that a particular mini-tag field value is only stored in one way of a particular set, providing the limitation to a particular way within the selected row. Cache control unit 256 ensures that a particular mini-tag value appears once per row by forcing a cache fill operation associated with an address that misses cache 250 to occupy a way formerly occupied by another address having the same mini-tag as the filling address. If none of the tag addresses match the same mini-tag, then a random replacement method is used to choose the way into which the cache fill will be stored. Therefore, a mini-tag appears once per row.

As mentioned above, cache control unit 256 is configured to determine the hit/miss status of a request. In order to perform the hit/miss determination, cache control unit 256 receives request bus 252 along with a tag bus 268. Tag bus 268 conveys the tag addresses and associated states stored within the selected set of tag storage 260. Cache control unit 256 compares the request address to the tag addresses, and processes the associated state information. In one embodiment, the hit/miss status is available during the clock cycle following the associated access. Hit/miss information is conveyed on a hit/miss bus 270 to the unit which requested the access. The receiving unit is configured to associate the hit/miss information with the appropriate request and to discard the data conveyed on data output bus 254 in response to the request if the request is a miss in cache 250.

Figure 3:
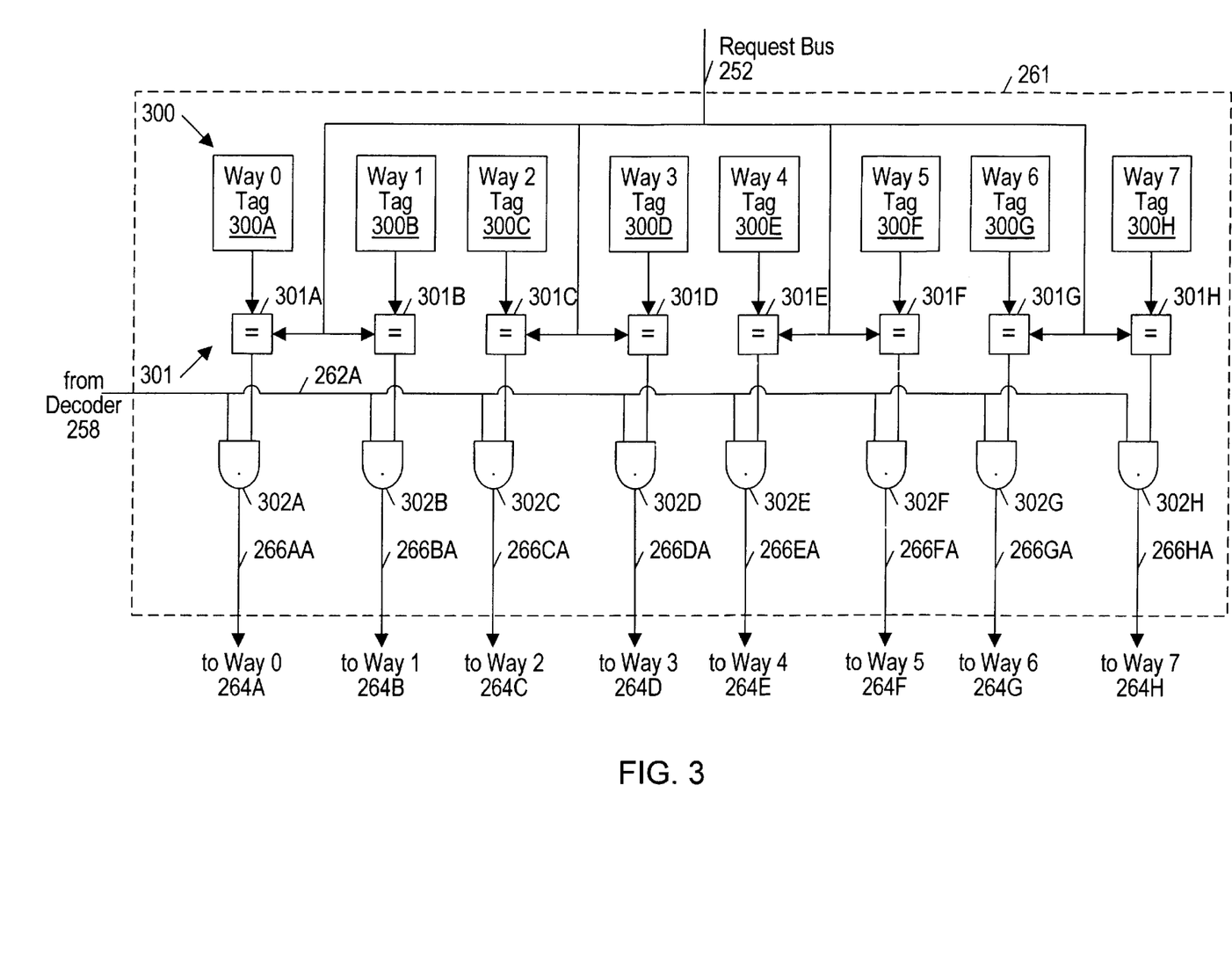
FIG. 3 is a logic diagram showing a row of the tag storage shown in FIG. 2.

Turning now to FIG. 3, an exemplary logic diagram of a set 261 within tag storage 260 is shown. Set 261 includes storage locations 300A–300H for each tag address stored in the current set. In the embodiment shown, an eight-way cache is implemented and thus eight storage locations exist within the set. Each storage location 300 is coupled to a respective comparator circuit 301A–301H. Comparator circuits 301 are configured to compare the mini-tag field of the tag address to the mini-tag field of the request address conveyed on request bus 252. Comparator circuits 301 produce a signal indicative of a match between the mini-tag fields (i.e. the mini-tag fields compare equal), and this signal is coupled as an input to a respective AND gate 302A–302H. AND gates 302A–302H provide the above mentioned qualification of the signals indicative of a matching compare of mini-tag fields. A decode signal 262A (one of the signals conveyed upon decode bus 262) indicative of selection of set 261 via the index of the request address is ANDed with the comparator signals. Therefore, an output signal from a set will be active if that set is selected by the index field of the request address and the mini-tag field of the request address matches the mini-tag field of the associated tag address. The output signals of AND gates 302A–302H are conveyed on way selection conductors 266AA, 266BA, 266CA, 266DA, 266EA, 266FA, 266GA, and 266HA (which are part of way selection buses 266A, 266B, 266C, 266D, 266E, 266F, 266G, and 266H, respectively). Each way selection conductor selects the associated row within the indicated way 264. The row within the indicated way 264 which receives an active row selection signal conveys its data bytes on output data bus 254.

As can be seen from the above description, the term "qualification" refers to selectively deactivating a signal which is activated based on partial information. The deactivation is performed according to the processing of the remainder of the information. In this case, the signals created by comparator circuits 301 are indicative of mini-tag matches between the tags stored in that set and the request address. However, this information is insufficient for a row of ways 264 to convey data on output data bus 254. In addition, a set of tag storage 260 is selected by decoding of the index field of the request address. Therefore, the comparator signals are qualified by the appropriate set selection signal. In this manner, at most one of way selection signals 266 may be active with respect to a given request address. Therefore, at most one set of data bytes is conveyed on output data bus 254.

It is noted that cache 250 is also suitable for use as a unified instruction/data cache. Embodiments of cache 250 employed in this manner are contemplated. Although the embodiment of cache 250 shown in FIGS. 2 and 3 is an eight way set-associative embodiment, cache 250 is suitable for any associativity. Embodiments of cache 250 utilizing other levels of associativity are contemplated. It is further noted that although the above discussion focuses on a single request address for simplicity, a similar structure is contemplated in which multiple request addresses access cache 250 within a single clock cycle. It is additionally noted that the circuits shown in FIG. 3 create signals which are active when conveying a logical one, and inactive when conveying a logical zero. However, similar circuits are contemplated for signals which are active when conveying a logical zero and inactive when conveying a logical one. In addition, similar circuits may be used for other signalling schemes.

Figure 4:
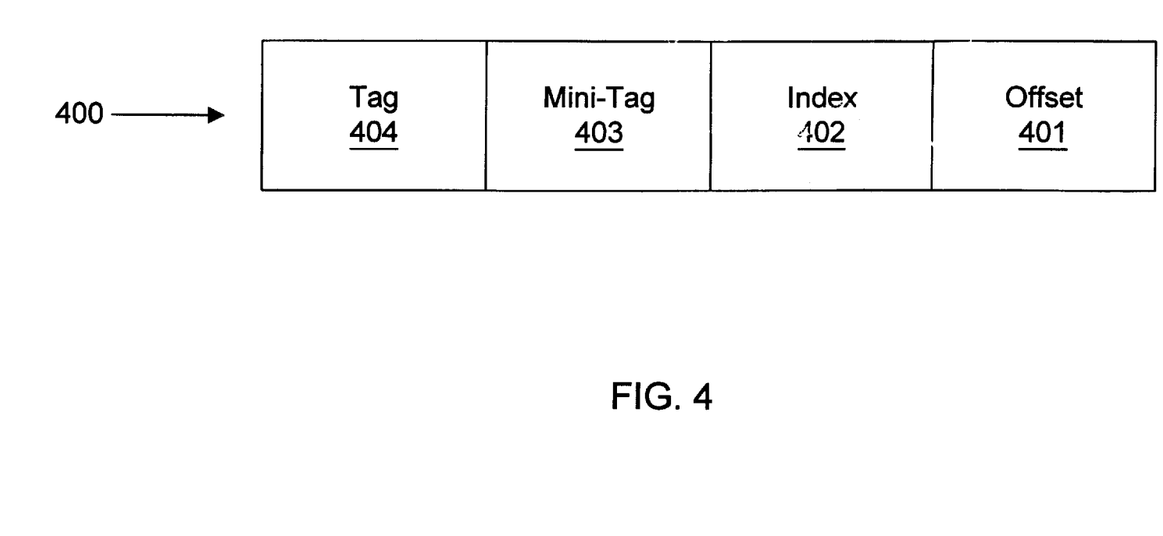
FIG. 4 is a diagram showing the fields of an address when the address is used to access the cache shown in FIG. 2.

Turning next to FIG. 4, a diagram showing the fields of a request address is shown. The most significant bits of the address are on the left as shown in FIG. 4, and the least significant bits are on the right as shown in FIG. 4. A request address 400 is logically divided into four fields when accessing cache 250. Offset field 401 includes the bits of the request address which identify bytes within the contiguous bytes stored within a row of a way 264. In one embodiment, cache 250 stores 32 contiguous bytes per row. Offset field 401 is 5 bits wide in this embodiment.

Address bits contiguous to offset field 401 form index field 402. Index field 402 is used by decoder 258 to select a set within tag storage 260 (and hence a row within ways 264). In one embodiment, cache 250 is eight way set-associative and capable of storing 32 kilobytes of data in 32 byte rows as described above. For this embodiment, cache 250 includes 128 rows and therefore index field 402 includes 7 bits of the request address.

Contiguous to index field 402 are the bits of the request address forming mini-tag field 403. Mini-tag field 403 may be any number of bits wide, so long as at least enough bits are used to allow each way of a row to be filled with a unique mini-tagged address. For example, for the eight way associative embodiment, mini-tag field 403 is at least three bits wide to accommodate at least eight different mini-tags. In one embodiment, mini-tag field 403 is six bits wide.

Bits of request address 400 not included in offset field 401, index field 402, or mini-tag field 403 form tag field 404. Tag field 404 (along with mini-tag field 403) is used by cache control unit 256 to determine the hit/miss status of the request address. In one embodiment, tag field 404 is 14 bits wide.

it is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608, filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran., now U.S. Pat. No. 5,619,464. The disclosure of this patent application is incorporated herein by reference in its entirety.

It is additionally noted that other aspects regarding superscalar microprocessors may be found in the co-pending, commonly assigned patent application entitled "Superscalar Microprocessor Including A High Performance Instruction Alignment Unit", Ser. No. 08/377,843, filed Jan. 25, 1995 by Witt, et al. The disclosure of this patent application is incorporated herein by reference in its entirety.

In accordance with the above disclosure an improved cache structure is described including a selection mechanism that allows access times substantially similar to a direct-mapped cache while still retaining the hit rate characteristics of a set associative cache. The present cache structure is suitable for high frequency superscalar microprocessors, which may benefit from the increased performance available utilizing an associative cache with quick access times.

Numerous variations and modifications will become apparent to those skilled in the art once the above disclosure is fully appreciated. It is intended that the following claims be interpreted to embrace all such variations and modifications.

What is claimed is:

1. A cache comprising:

an input bus configured to convey at least one request address;

a plurality of data storage locations configured to store contiguous bytes of information;

a plurality of tag storage locations coupled to said input bus, wherein said plurality of tag storage locations are configured to store tag addresses associated with said contiguous bytes of information;

a plurality of comparator circuits coupled to said input bus and to said plurality of tag storage locations, wherein said plurality of comparator circuits are configured to receive a first field of address bits from said request address and to receive corresponding fields of address bits from said tag addresses, and wherein each of said plurality of comparator circuits is configured to produce a first signal indicative of equality between said first field and one of said corresponding fields;

a decoder coupled to said input bus and to said plurality of tag storage locations wherein said decoder is configured to convey a second signal indicative of selection of a group of said plurality of storage locations according to a second field of address bits from said request address; and a qualification circuit coupled to receive said first signals and said second signal, wherein said qualification circuit qualifies each of said first signals with said second signal, thereby producing a third signal, and wherein said plurality of data storage locations are coupled to receive said third signal and to convey data bytes upon an output bus according to said third signal.

2. The cache as recited in claim 1 wherein said qualification circuit is configured to qualify said first signal with said second signal such that said third signal causes one of said plurality of data storage locations to convey bytes on said output bus if said second signal is indicative of selection.

3. The cache as recited in claim 1 wherein said qualification circuit is configured to qualify said first signal with said second signal such that said third signal causes one of said plurality of data storage locations not to convey bytes on said output bus if said second signal is not indicative of selection.

4. The cache as recited in claim 1 wherein said qualification circuit logically ANDs said second signal with said first signal, and wherein a result of said ANDing is indicative of selection of a tag storage address and equality of said first field and said one of said corresponding fields of said tag storage address.

5. The cache as recited in claim 1 further comprising a cache control unit coupled to said input bus and to said plurality of tag storage locations wherein said cache control unit is configured to determine a hit/miss status of said request address.

6. The cache as recited in claim 5 wherein said cache control unit determines said hit/miss status during a second clock cycle subsequent to a first clock cycle in which said request address accesses said cache.

7. The cache as recited in claim 1 wherein said cache is an associative cache.

8. The cache as recited in claim 1 wherein said cache is a data cache.

9. The cache as recited in claim 8 wherein said bytes of information are data bytes which are manipulated by instructions.

10. The cache as recited in claim 1 wherein said cache is an instruction cache.

11. The cache as recited in claim 10 wherein said bytes of information are instruction bytes forming one or more instructions.

12. The cache as recited in claim 5 wherein a new tag address is stored into one of said plurality of tag storage locations when said cache control determines a cache miss of said request address.

13. The cache as recited in claim 1 wherein said first field of address bits comprises a mini-tag.

14. The cache as recited in claim 13 wherein said second field of address bits comprises an index.

15. The cache as recited in claim 14 wherein said plurality of data storage locations comprise a plurality of sets and a plurality of ways, wherein said mini-tag is used to select one of said plurality of ways, and wherein said index is used to select one of said plurality of sets.

16. A set associative cache comprising:

an input bus configured to convey at least one request address, wherein each of said at least one request address includes a mini-tag and an index;

a plurality of data storage locations configured to store contiguous bytes of information, where said plurality of data storage locations include a plurality of sets and a plurality of ways;

a plurality of tag storage locations coupled to said input bus, wherein said plurality of tag storage locations are configured to store tag addresses associated with said contiguous bytes of information;

a plurality of comparator circuits coupled to said input bus and to said plurality of tag storage locations, wherein each of said plurality of comparator circuits are configured to produce a first signal indicative of selection of one of said plurality of ways according to said mini-tag from said request address;

a decoder coupled to said input bus and to said plurality of tag storage locations, wherein said decoder is configured to convey a second signal indicative of selection of one of said plurality of sets according to said index from said request address;

a qualification circuit coupled to receive said first signal and said second signal, wherein said qualification circuit produces a third signal based upon each of said first signals and said second signal, and wherein said plurality of data storage locations are coupled to receive said third signal and to convey data bytes upon an output bus according to said third signal;

a cache control unit coupled to said input bus and to said plurality of storage locations wherein said cache control unit is configured to determine a hit/miss status of said request address, wherein said cache control unit determines said hit/miss status during a first clock cycle immediately subsequent to a second clock cycle where said request address accesses said cache.

17. A method of accessing an associative cache comprising:

accessing a tag storage within said associative cache with a request address;

comparing a first field of address bits from said request address to respective fields of address bits from tag addresses stored within said tag storage;

qualifying a resulting equivalence from said comparing step with a decoder signal generated from a second field of address bits from said request address; and conveying bytes of information associated with a particular tag address indicated by said qualifying to an output of said associative cache.

18. The method as recited in claim 17 wherein said first field of address bits includes fewer bits than a number of address bits stored from a particular address into said tab storage.

19. The method as recited in claim 17 further comprising storing a new tag address into said cache when said new tag address accesses said associative cache and misses.

20. The method as recited in claim 19 wherein said new tag address is stored into a storage location in which said particular tag address is stored.

21. The method as recited in claim 17 wherein said accessing includes indexing said associative cache according to a second field of address bits.

22. The method as recited in claim 17 further comprising determining that said request address is a hit in said data cache.

23. The method as recited in claim 22 wherein said determining occurs during a second clock cycle subsequent to a first clock cycle in which said accessing occurs.

24. A superscalar microprocessor comprising a data cache including:
   an input bus configured to convey at least one request address;
   a plurality of data storage locations coupled to store data bytes;
   a plurality of tag storage locations coupled to said input bus, wherein said plurality of tag storage locations are configured to store tag addresses associated with said data bytes;
   a plurality of comparator circuits coupled to said input bus and to said plurality of tag storage locations, wherein said plurality of comparator circuits are configured to receive a first field of address bits from said request address and to receive corresponding fields of address bits from said tag addresses, and wherein each of said plurality of comparator circuits is configured to produce a first signal indicative of equality between said first field and one of said corresponding fields;
   a decoder coupled to said input bus and to said plurality of tag storage locations wherein said decoder is configured to convey a second signal indicative of selection of a group of said plurality of storage locations according to a second field of address bits from said request address; and
   a qualification circuit coupled to receive said first signals and said second signal, wherein said qualification circuit qualifies each of said first signals with said second signal thereby producing a third signal, and wherein said plurality of data storage locations are coupled to receive said third signal and to convey data bytes upon an output bus according to said third signal.

25. The superscalar microprocessor as recited in claim 24 further comprising a load/store unit coupled to said data cache wherein said load/store unit is configured to execute load and store memory accesses, and wherein said load/store unit is configured to convey a request address on said input bus, and wherein said load/store unit is configured to receive said data bytes from said output bus.

26. The superscalar microprocessor as recited in claim 24 further comprising an instruction cache including:
   a second input bus configured to convey at least one instruction address;
   a second plurality of data storage locations configured to store instruction bytes;
   a second plurality of tag storage locations coupled to said input bus, wherein said second plurality of tag storage locations are configured to store tag addresses associated with said instruction bytes;
   a second plurality of comparator circuits coupled to said second input bus and to said second plurality of tag storage locations, wherein said second plurality of comparator circuits are configured to receive a third field of address bits from said instruction address and to receive second corresponding fields of address bits from said tag addresses stored in said second plurality of tag storage locations, and wherein each of said second plurality of comparator circuits is configured to produce a fourth signal indicative of equality between said third field and said one of said second corresponding fields;
   a second decoder coupled to said second input bus and to said second plurality of tag storage locations wherein said second decoder is configured to convey a fifth signal indicative of selection of a group of said second plurality of storage locations according to a fourth field of address bits from said request address; and
   a second qualification circuit coupled to receive said fourth signals and said fifth signal, wherein said qualification circuit qualifies each of said fourth signals with said fifth signal thereby producing a sixth signal, and wherein said second plurality of data storage locations are coupled to receive said sixth signal and to convey instruction bytes upon a second output bus according to said sixth signal.

27. The superscalar microprocessor as recited in claim 26 further comprising an instruction alignment unit coupled to said instruction cache wherein said instruction alignment unit is configured to receive said instruction bytes from said second output bus and wherein said instruction alignment unit is configured to align instructions within said instruction bytes to a plurality of decode units.

28. The superscalar microprocessor as recited in claim 27 further comprising said plurality of decode units configured to decode instructions received from said instruction alignment unit into decode instructions.

29. The superscalar microprocessor as recited in claim 28 further comprising a plurality of reservation stations wherein each of said plurality of reservation stations is coupled to a respective one of said plurality of decode units, and wherein said plurality of reservation stations are configured to store said decoded instructions.

30. The superscalar microprocessor as recited in claim 29 further comprising a plurality of functional units wherein each of said plurality of functional units is coupled to a respective one of said plurality of reservation stations, and wherein said plurality of functional units are configured to execute said decoded instructions stored in said plurality of reservation stations.

31. The superscalar microprocessor as recited in claim 24 wherein said first field of address bits comprises a mini-tag.

32. The superscalar microprocessor as recited in claim 31 wherein said second field of address bits comprises an index.

33. The superscalar microprocessor as recited in claim 26 wherein said third field of address bits comprises a mini-tag.

34. The superscalar microprocessor as recited in claim 26 wherein said fourth field of address bits comprises an index.

* * * * *

UNITED STATES PATENT AND TRADEMARK OFFICE
CERTIFICATE OF CORRECTION

PATENT NO. : 5,893,146

DATED : April 6, 1999

INVENTOR(S) :
James K. Pickett

It is certified that error appears in the above-identified patent and that said Letters Patent is hereby corrected as shown below:

In the Claims:

Claim 18, col. 14, line 66, please change "tab" to "tag".

Signed and Sealed this

Fourteenth Day of September, 1999

Attest:

Q. TODD DICKINSON

*Attesting Officer*       *Acting Commissioner of Patents and Trademarks*

UNITED STATES PATENT AND TRADEMARK OFFICE
CERTIFICATE OF CORRECTION

PATENT NO. : 5,893,146
DATED : April 6, 1999
INVENTOR(S) : James K. Pickett

It is certified that error appears in the above-identified patent and that said Letters Patent is hereby corrected as shown below:

On the title page, item [73] Assignee should read:

Advanced Micro Devices, Inc., Sunnyvale, CA.

Signed and Sealed this

Ninth Day of January, 2001

Attest:

Q. TODD DICKINSON

Attesting Officer      Commissioner of Patents and Trademarks